(12) United States Patent
Münzmay et al.

(10) Patent No.: US 8,119,729 B2
(45) Date of Patent: Feb. 21, 2012

(54) AQUEOUS SECONDARY POLYMER DISPERSIONS FOR THE PRODUCTION OF COATINGS

(75) Inventors: Thomas Münzmay, Dormagen (DE); Alice Münzmay, legal representative, Dormagen (DE); Martin Melchiors, Leichlingen (DE); Sandra Hackbarth, Bedburg (DE); Heinz-Dietmar Gewiβ, Meerbusch (DE)

(73) Assignee: Bayer MaterialScience AG, Leverkusen (DE)

( * ) Notice: Subject to any disclaimer, the term of this patent is extended or adjusted under 35 U.S.C. 154(b) by 0 days.

(21) Appl. No.: 12/177,256

(22) Filed: Jul. 22, 2008

(65) Prior Publication Data

US 2009/0105409 A1 Apr. 23, 2009

(30) Foreign Application Priority Data

Jul. 27, 2007 (DE) .......................... 10 2007 035 366

(51) Int. Cl.
*C08L 33/06* (2006.01)
(52) U.S. Cl. ........ 524/561; 524/458; 524/504; 524/522; 524/523; 524/524; 524/560
(58) Field of Classification Search ............ 524/458, 524/504, 522, 523, 524, 560, 561
See application file for complete search history.

(56) References Cited

U.S. PATENT DOCUMENTS

| | | | |
|---|---|---|---|
| 4,871,797 A * | 10/1989 | Buter | 524/505 |
| 4,973,621 A | 11/1990 | Buter | |
| 5,011,882 A | 4/1991 | Shingo et al. | |
| 5,093,411 A * | 3/1992 | Buter | 524/761 |
| 5,252,696 A | 10/1993 | Laas et al. | |
| 5,942,570 A * | 8/1999 | Matsukura et al. | 524/522 |
| 6,399,691 B1 * | 6/2002 | Melchiors et al. | 524/457 |
| 6,426,414 B1 | 7/2002 | Laas et al. | |
| 6,451,899 B1 * | 9/2002 | Zhao et al. | 524/501 |
| 6,531,535 B2 * | 3/2003 | Melchiors et al. | 524/457 |
| 6,586,521 B2 | 7/2003 | Blum et al. | |
| 6,767,958 B2 | 7/2004 | Laas et al. | |
| 7,262,255 B2 | 8/2007 | Winter et al. | |
| 2006/0100305 A1 | 5/2006 | Ma | |

FOREIGN PATENT DOCUMENTS

| | | |
|---|---|---|
| DE | 2536312 | 2/1977 |
| DE | 10007821 A1 | 8/2001 |
| DE | 10024624 A1 | 11/2001 |
| EP | 0287144 | 10/1988 |
| EP | 0292004 | 11/1988 |
| EP | 0540985 A1 | 5/1993 |
| EP | 0947557 A2 | 10/1999 |
| EP | 0959087 A1 | 11/1999 |
| GB | 1505476 | 3/1978 |
| WO | WO-99/45078 | 9/1999 |
| WO | WO-00/39181 A1 | 7/2000 |
| WO | WO-02/079296 A2 | 10/2002 |

* cited by examiner

*Primary Examiner* — David Wu
*Assistant Examiner* — Marie Reddick
(74) *Attorney, Agent, or Firm* — Connolly Bove Lodge & Hutz LLP

(57) ABSTRACT

The invention concerns aqueous secondary polymer dispersions based on special acrylate building blocks, a process for their production and their use as binders for the production of blister-free coatings.

6 Claims, No Drawings

AQUEOUS SECONDARY POLYMER DISPERSIONS FOR THE PRODUCTION OF COATINGS

CROSS-REFERENCE TO RELATED APPLICATION

This application claims priority under 35 U.S.C. §119 to German Patent Application No. 10 2007 035 366.0 filed Jul. 27, 2007, which is incorporated by reference in its entirety for all useful purposes.

BACKGROUND OF THE INVENTION

Field of the Invention

The invention concerns aqueous secondary dispersions of polymers based on special acrylate building blocks, a process for their production and their use as binders for the production of blister-free coatings.

The use of dispersions based on polyacrylates in water-dilutable paints and coating systems is known from a number of publications and patents.

When any paint is applied to a substrate, air in dissolved form or in the form of microbubbles is trapped in the paint film. As the paint dries and solvent and/or water evaporates, bubbles form or the existing microbubbles grow. Some of these bubbles dissolve again in the paint polymer, others rise to the surface of the paint and burst (rise & rupture model). At a certain film thickness, some of the bubbles are no longer able to burst completely and visible paint film defects such as blisters, pin holes or craters are formed. The film thickness at which this phenomenon occurs is known as the "blister-free film thickness" or "popping limit". The blister-free film thickness is a substantial quality feature for the processing reliability of a paint.

The blister-free film thickness of aqueous two-component polyurethane (PU) paints of the prior art is 60 to 80 µm (see W. Hovestadt and E. Jürgens (1999)—Blasenfreie Applikation wässriger 2K-PUR-Lacke, in: Farbe & Lack 8/99: 30-37, and WO-A 2002/079296). When painting three-dimensional components in particular, however, flow effects mean that regions always occur in which paint film thicknesses of more than the cited 60 to 80 µm arise. The use of aqueous two-component PU paints of the prior art can then lead to bubbles in the paint, resulting in serious defects in the paint surface and hence in a reduction in value of the painted components.

This has resulted in an urgent need for aqueous dispersions which can be used to obtain two-component PU paints having an elevated blister-free film thickness. These paints should be based on dispersions which owing to reactive groups are capable of curing with suitable crosslinkers to form high-quality coatings even at room temperature. The dispersions should furthermore have a high solids content and excellent stability in storage, both as a dispersion and in the paint. The paint films should in addition exhibit very good resistance properties against solvents, water and environmental influences.

SUMMARY OF THE INVENTION

The object of the present invention was therefore to provide aqueous secondary dispersions of polymers, which can be used to obtain aqueous two-component PU paints having an elevated blister-free film thickness and which satisfy the aforementioned requirements.

Surprisingly it has now been found that secondary polymer dispersions containing selected (meth)acrylic acid ester building blocks as monomers are extremely suitable for producing aqueous two-component PU paints having a significantly elevated blister-free film thickness.

The present invention thus provides aqueous secondary dispersions containing a copolymer P), synthesised from I) a hydroxy-functional, hydrophobic polymer containing as structural monomers Ia) (meth)acrylic acid esters having $C_1$ to $C_{22}$ hydrocarbon radicals in the alcohol part and/or vinyl aromatics and/or vinyl esters and Ib) hydroxy-functional monomers and II) a hydroxy-functional, hydrophilic polymer containing as structural components IIa) (meth)acrylic acid esters having $C_1$ to $C_{22}$ hydrocarbon radicals in the alcohol part and/or vinyl aromatics and/or vinyl esters, IIb) hydroxy-functional monomers and IIc) acid-functional monomers, wherein the structural monomers of the (meth)acrylic acid ester type (Ia)/(IIa) contain special monomers B) which have an aliphatic radical having at least eight carbon atoms in the alcohol part and whose content, based on the polymer P), is at least 12.5 wt. %, preferably 15 to 60 wt. %, particularly preferably 20 to 45 wt. %.

DETAILED DESCRIPTION OF THE INVENTION

As used herein in the specification and claims, including as used in the examples and unless otherwise expressly specified, all numbers may be read as if prefaced by the word "about", even if the term does not expressly appear. Also, any numerical range recited herein is intended to include all subranges subsumed therein.

The copolymer P) can optionally also contain as a further polymerisation stage a hydroxy-functional, hydrophobic copolymer II') based on hydroxy-functional (meth)acrylic acid esters or based on hydroxy-functional (meth)acrylic acid esters and non-functional (meth)acrylic acid esters or vinyl aromatics as structural components. This is produced in situ, following production of the copolymer II), by copolymerisation of the monomers.

Suitable monomers Ia)/IIa) are the esterification products of acrylic or methacrylic acid with simple alcohols, e.g. ethyl acrylate, ethyl methacrylate, n-butyl acrylate, iso-butyl acrylate, tert-butyl acrylate, monomers B, methyl methacrylate, n-butyl methacrylate, cyclohexyl acrylate and cyclohexyl methacrylate, and vinyl phenyls such as styrene, vinyl toluene, α-methyl styrene and mixtures thereof and other monomers. Preferred (meth)acrylic acid esters a) are those with linear or branched aliphatic hydrocarbon radicals having 1 to 18 C atoms. n-Butyl acrylate, methyl methacrylate, n-butyl methacrylate and styrene are particularly preferred.

Suitable monomers Ia)/IIa) are moreover the esterification products of vinyl alcohol with linear or branched, aliphatic carboxylic acids such as for example vinyl acetate, vinyl propionate or vinyl butyrate. Vinyl esters of branched, aliphatic carboxylic acids having the general formula (I),

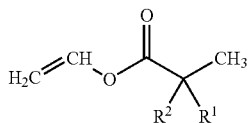

(I)

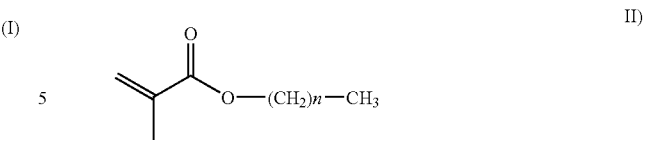

(II)

wherein
n=12, 16.4 or 17.

are preferred, wherein $R^1$ and $R^2$ are saturated alkyl groups together containing 6, 7 or 8 C atoms, corresponding to the compounds VeoVa™ 9, 10 and 11.

The cited monomers differ in respect of the glass transition temperature of their homopolymers:

| Monomer | $T_G$ [° C.] |
| --- | --- |
| VeoVa ™ 9 | +70 |
| VeoVa ™ 10 | −3 |
| VeoVa ™ 11 | −40 |

Further monomers capable of radical copolymerisation can optionally also be used as compounds of component Ia/IIa) in the production of copolymer I). These can be, for example, derivatives of acrylic or methacrylic acid such as acrylamide, methacrylamide, acrylonitrile or methacrylonitrile. Vinyl ethers are also possible. Other possibilities for components Ia/IIa) for use optionally in smaller amounts are difunctional or more highly functional (meth)acrylate monomers and/or vinyl monomers, such as e.g. hexanediol di(meth)acrylate or divinyl benzene. Alkylene oxide-modified or chain-extended, polymerisable monomers having a number-average molecular weight of ≦3000 g/mol, preferably ≦500 g/mol, can likewise be used in Ia/IIa). Suitable alkylene oxides for this purpose are preferably ethylene, propylene or butylene oxide, individually or in mixtures.

The polyacrylates according to the invention contain at least 12.5 wt. %, preferably 15 to 60 wt. %, particularly preferably 20 to 45 wt. %, based on the resin, of special monomers B) of the (meth)acrylic acid ester type, which contain an aliphatic radical having at least eight carbon atoms. Suitable monomers of this type are the esters of acrylic acid or methacrylic acid with aliphatic alcohols (monools) having at least eight carbon atoms, aliphatic, saturated, linear alcohols having at least eight carbon atoms being preferred.

Suitable aliphatic, saturated, linear alcohols are for example those derived from naturally occurring fatty acids such as lauryl ($C_{12}$), myristyl ($C_{14}$), palmityl ($C_{16}$), stearyl ($C_{18}$) and behenyl ($C_{22}$) alcohol. Other suitable aliphatic, saturated alcohols are for example 2-ethyl hexanol, n-octanol, nonanol or n-decanol.

Further suitable monomers B) of the (meth)acrylic acid ester type containing an aliphatic radical having at least eight carbon atoms are 2-ethylhexyl acrylate, lauryl acrylate, myristyl acrylate, palmityl acrylate, stearyl acrylate or behenyl acrylate and the corresponding methacrylic acid derivatives. Particularly preferred monomers B) contain 12 to 22 carbon atoms in the alcohol radical, such as for example compounds having the general formula (II), Also suitable as monomers B) are (meth)acrylic acid esters based on cycloaliphatic alcohols (monools) having at least ten carbon atoms, such as for example i-bornyl acrylate or i-bornyl methacrylate.

Suitable hydroxy-functional monomers Ib)/IIb) are for example 2-hydroxyethyl methacrylate, 2-hydroxypropyl methacrylate, 2-hydroxyethyl acrylate, 2-hydroxypropyl acrylate, 4-hydroxybutyl acrylate, 4-hydroxybutyl methacrylate. Preferred monomers Ib)/IIb) are 2-hydroxyethyl methacrylate, 2-hydroxypropyl methacrylate or 4-hydroxybutyl acrylate and mixtures of these compounds.

Suitable olefinically unsaturated, acid-functional monomers IIc) are sulfonic or carboxylic acid-functional monomers, wherein carboxylic acid-functional monomers such as acrylic acid, methacrylic acid, β-carboxyethyl acrylate, crotonic acid, fumaric acid, maleic anhydride, itaconic acid or monoalkyl esters of dibasic acids or anhydrides such as e.g. maleic acid monoalkyl esters are preferred, acrylic or methacrylic acid being particularly preferred.

Also suitable as compounds of component IIc) are unsaturated, radically polymerisable compounds having phosphate or phosphonate or sulfonic acid or sulfonate groups, such as for example those described in WO-A 00/39181 (page 8, line 13 to page 9, line 19).

The proportion of monomers Ia)/IIa), including monomers B), in copolymer P) is 23 to 89.4 parts by weight, preferably 48 to 85.3 parts by weight and particularly preferably 56.5 to 81.5 parts by weight, the proportion of monomers Ib)/IIb) in copolymer P) is 10 to 65 parts by weight, preferably 13.5 to 46.5 parts by weight and particularly preferably 17 to 40 parts by weight, and the proportion of monomers IIc) in copolymer P) is 0.6 to 12 parts by weight, preferably 1.2 to 5.5 parts by weight and particularly preferably 1.5 to 3.5 parts by weight.

The acid-functional monomers IIc) are used in an amount such that the copolymer P) has an acid value of 5 to 55 mg KOH/g solid, preferably 10 to 35 mg KOH/g solid and particularly preferably 12.5 to 27.5 mg KOH/g solid.

The proportion of hydroxy-functional, hydrophobic graft base I) in copolymer P) is 50 to 95 parts by weight, preferably 75 to 90 parts by weight, the proportion of hydroxy-functional, hydrophilic polymer II) in copolymer P) is 5 to 50 parts by weight, preferably 10 to 25 parts by weight.

The procedure for polymerising the unsaturated monomers is familiar per se to the person skilled in the art. Typically, a suitable solvent is placed in a reaction vessel and the unsaturated monomers are fed in and polymerised using a radical initiator.

Suitable initiators for the polymerisation reaction are organic peroxides such as di-tert-butyl peroxide, dicumyl peroxide or tert-butyl peroxy-2-ethyl hexanoate and azo compounds such as azodiisobutyric acid nitrile (AIBN). The amounts of initiators used depend on the desired molecular weight. For reasons of process safety and easier handling, peroxide initiators can also be used as a solution in suitable organic solvents of the aforementioned type.

The preferred embodiment of the process involves a two-stage addition and polymerisation of monomer mixtures I)

and II) in the cited sequence. In a first step (i) a hydroxy-functional, hydrophobic polymer I) having an OH value of 12 to 250 mg KOH/g solid, preferably 50 to 200 mg KOH/g solid, is produced from monomers Ia) and Ib). In a subsequent step (ii) the hydroxy-functional, hydrophilic polymer II) is produced from monomers IIa) to IIc) in the solution of polymer I) obtained from step (i), wherein this hydroxy-functional, hydrophilic polymer II) has an OH value of 20 to 250 mg KOH/g solid, preferably 120 to 220 mg KOH/g solid, and an acid value of 50 to 250 mg KOH/g solid, preferably 110 to 200 mg KOH/g solid.

The special monomers B) can be used in both structural component Ia) and in structural component IIa). They are preferably introduced into the polymer via structural component Ia).

The copolymer P) is produced by means of a radically initiated copolymerisation of the monomer mixture I) and II) in organic co-solvents C). The amount of organic solvents is determined such that the resulting copolymer solutions have a solids content of 95 to 60 wt. %, preferably 92.5 to 80 wt. %.

Any solvents known in paint technology are suitable as organic solvents C), wherein those which are conventionally used as co-solvents in aqueous dispersions are preferred, such as for example alcohols, ethers, ether group-containing alcohols, esters, ketones or non-polar hydrocarbons, for example aliphatic or aromatic hydrocarbons, or mixtures of these solvents.

Organic amines or water-soluble, inorganic bases can be used to neutralise the acid groups, preferably carboxyl groups, polymerised into polymer II) via monomer IIc). N-Methyl morpholine, triethylamine, dimethyl ethanolamine, dimethyl isopropanolamine, methyl diethanolamine, triethanolamine or ethyl diisopropylamine are preferred. Likewise suitable are diethyl ethanolamine, butanolamine, morpholine, 2-aminomethyl-2-methyl propanol or isophorone diamine.

The neutralising agent is added in amounts such that the degree of neutralisation is 70 to 130%, preferably 90 to 105% of the acid groups, wherein an amount of neutralising agent is particularly preferably added such that free neutralising agent is still present after all acid groups have been converted to the salt form. This corresponds to a degree of neutralisation of >100%. It has been found that dispersion stability, paint stability, pigment wetting and film appearance properties can be significantly improved in this way.

The pH of the aqueous dispersion is 6.0 to 11.0, preferably 7.0 to 10.0, the solids content is 35 to 65 wt. %, preferably 40 to 55 wt. %.

The present invention thus also provides a process for producing the aqueous polyacrylate dispersions according to the invention, characterised in that in a first step (i) a hydroxy-functional, hydrophobic graft base I) having an OH value of 12 to 250 mg KOH/g solid is produced from monomers Ia) and Ib), in a second step (ii) the monomers IIa) to IIc) are polymerised in the solution of graft base I) obtained from step (i), wherein monomers B) are used in step (i) and/or in step (ii), preferably in step (i), and the resulting hydroxy-functional, hydrophilic polymer has an OH value of 20 to 250 mg KOH/g solid and an acid value of 50 to 250 mg KOH/g solid and the radically initiated copolymerisation of the mixture of monomers I) and II) takes place in co-solvents C) and then the neutralising agent to produce the ionic groups necessary for dispersion is added after this copolymer production, followed by the dispersion step obtained by adding water to the copolymer or by transferring the copolymer into a volume of water.

The aqueous polyacrylate dispersions according to the invention are optionally used together with other binders or dispersions, e.g. based on polyesters, polyurethanes, polyethers, polyepoxides or polyacrylates, in combination with crosslinker resins and optionally pigments in or as a paint or coating compound. The conventional auxiliary substances and additives of paint technology, such as for example defoaming agents, thickeners, pigments, dispersing agents, catalysts, anti-skinning agents, anti-settling agents or emulsifiers, can be added before, during or after production of the aqueous paints or binders by mixing the individual components and also in the case of production of coating compounds for processing as a single component.

The present invention likewise provides coating compounds containing the aqueous polyacrylate dispersions according to the invention.

The coating compounds containing the aqueous polyacrylate dispersions according to the invention are suitable for all applications in which aqueous paint and coating systems having a superior range of properties are used, for example coating of mineral building material surfaces, painting and sealing of wood and wood-based materials, coating of metallic surfaces, coating and painting of asphaltic or bituminous road coverings, or painting and sealing of various plastic surfaces.

The paints or coating compounds based on the aqueous polyacrylate dispersions according to the invention are primers, fillers, pigmented or transparent top coats or clear coats and one-coat paints which can be used in individual and standard applications, e.g. in the area of industrial painting and automotive base and refinishing painting.

The aqueous polyacrylate dispersions according to the invention are preferably used in combination with hydrophilic and/or hydrophobic polyisocyanates, particularly preferably in combination with mixtures of hydrophilic and hydrophobic polyisocyanates, to produce two-component coating compounds or paints for metallic surfaces or plastics at room temperature up to 180° C., or in combination with amino crosslinker resins to produce coatings and paints for metallic surfaces at 110 to 180° C. in the form of one-coat paints or as top coats.

The present invention likewise provides two-component coating compounds containing the aqueous polyacrylate dispersions according to the invention together with at least one crosslinker, preferably polyisocyanates.

Such polyisocyanates typically have two or more NCO groups per molecule and are based for example on isophorone diisocyanate, hexamethylene diisocyanate, 1,4-diisocyanatocyclohexane, bis-(4-isocyanatocyclohexane)methane, 1,3-diisocyanatobenzene, triisocyanatononane or isomeric 2,4- and 2,6-TDI and can also have urethane, isocyanurate and/or biuret groups.

The use of low-viscosity, optionally hydrophilised, polyisocyanates of the aforementioned type based on aliphatic or cycloaliphatic isocyanates is preferred.

The polyisocyanates used as crosslinkers generally have a viscosity of 10 to 5000 mPas at 23° C. and can also be used mixed with small amounts of inert solvents if desired, in order to adjust the viscosity.

Water-soluble or dispersible polyisocyanates can be obtained for example by modification with carboxylate, sulfonate and/or polyethylene oxide groups and/or polyethylene oxide/polypropylene oxide groups. The polyisocyanates can be hydrophilised by reacting for example with small amounts of monohydric, hydrophilic polyether alcohols. The production of such hydrophilised polyisocyanates is described for example in EP-A 0 540 985 (page 3, line 55 to page 4, line 5).

Also suitable are the water-dispersible polyisocyanate mixtures based on triisocyanatononane described in DE-A 100 078 21 (page 2, line 66 to page 3, line 5) and polyisocyanates hydrophilised with ionic groups (sulfonate, phosphonate groups), as described for example in DE-A 100 24 624 (page 3, lines 13 to 33).

Also very suitable are the allophanate group-containing polyisocyanates described in EP-A 959 087 (page 3, lines 39 to 51), which are produced by reacting low-monomer polyisocyanates with polyethylene oxide polyether alcohols under allophanatisation conditions.

The use of mixtures of the aforementioned polyisocyanate crosslinkers is of course also possible in principle. Mixtures containing hydrophilised polyisocyanates in addition to the allophanate-modified polyisocyanates described above are particularly preferred.

The coating can be produced by means of the various spraying methods, such as compressed air, airless or electrostatic spraying methods, using one-component or optionally two-component spraying plants. The coating compounds produced with the aqueous polyacrylate dispersions according to the invention can also be applied by other methods, however, for example by brushing, rolling or knife application.

EXAMPLES

Raw Materials

I) Monomers

Acrylic acid
n-Butyl acrylate
n-Butyl methacrylate
2-Ethylhexyl methacrylate
2-Hydroxyethyl methacrylate
Methyl methacrylate
Methacrylic Acid Esters:

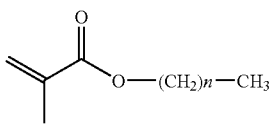

Methacrylic acid ester 13.0 "AM009": n=12, synthetic lauryl methacrylate (CAS no. 90551-76-1, Röhm GmbH & Co. K G, Darmstadt)
Methacrylic acid ester 17.4 "AM010": n=16.4 (CAS no. 90551-84-1, Röhm GmbH & Co. K G, Darmstadt)
Stearyl methacrylate: n=17 (CAS no. 32360-05-7)

II) Initiator

Di-tert-butyl peroxide

III) Solvents

| Butoxyl ®: | Acetic acid-(3-methoxy-n-butyl) ester (Celanese Chemicals Europe GmbH), Germany |
| --- | --- |
| Solvesso ® 100: | Aromatic hydrocarbon, initial boiling point (ASTM D86-05) 162° C., Exxon-Chemie, Esso Deutschland GmbH |

IV) Others

| Baysilon ® VP AI 3468: | Flow control agent, Lanxess AG, Leverkusen, DE |
| --- | --- |
| Bayhydur ® VP LS 2319: | Hydrophilised, aliphatic polyisocyanate based on hexamethylene diisocyanate, NCO content = 18.2 ± 0.5%, Bayer MaterialScience AG, Leverkusen, DE |
| Borchigel ® PW25: | Thickener, Borchers GmbH, Langenfeld, DE |
| Desmodur ® XP 2565: | Aliphatic, allophanate-modified polyisocyanate based on isophorone diisocyanate, 80% in butyl acetate, NCO content = 12.0 ± 0.5%, Bayer MaterialScience AG, Leverkusen, DE |
| Surfynol ® 104 BC: | Defoaming agent and wetting agent, AirProducts GmbH, DE |

Comparative Example 1

Example 3 from EP-A 0 947 557)

186 g of butyl glycol and 186 g of Solvesso® 100 were placed in a 6 l reaction vessel with stirrer, cooling device and heating device and heated to 145° C. At this temperature a mixture 1) consisting of 750 g of methyl methacrylate, 125 g of styrene, 445 g of 2-hydroxyethyl methacrylate, 538 g of n-butyl acrylate and 87 g of n-butyl methacrylate was added in 3 hours, immediately followed by a mixture 2) consisting of 128 g of methyl methacrylate, 180 g of 2-hydroxyethyl methacrylate, 100 g of n-butyl acrylate and 60 g of acrylic acid in 1.5 hours. In parallel, a solution of 88 g of di-tert-butyl peroxide in 70 g of a 1:1 mixture of butyl glycol and Solvesso® 100 was added within 5 hours. The mixture was then stirred for 2 hours at 145° C., then cooled to 100° C. and 76 g of N,N-dimethyl ethanolamine were added. After homogenising for 30 minutes, the mixture was dispersed with 2700 g of water within 2 hours at 80° C. A dispersion with the following data was obtained:

| OH content (solids, calculated theoretically) | 3.3% |
| --- | --- |
| Acid value (solids) | 20 mg KOH/g |
| Solids content | 43.8% |
| Viscosity | 1400 mPas$_{23° C.}$ |
| pH (10% in water) | 8.1 |
| Degree of neutralisation | 105% |
| Average particle size | 110 nm |
| Co-solvent: | 7.7 wt. % |

Example 2

According to the Invention, 15% Methacrylic Acid Ester 17.4

158.3 g of butyl glycol and 220.6 g of Solvesso® 100 were placed in a 6 l reaction vessel with stirrer, cooling device and heating device and heated to 138° C. At this temperature a mixture consisting of 8 g of butyl glycol and 8 g of di-tert-butyl peroxide was added dropwise within 30 minutes. Then a mixture consisting of 34.3 g of butyl glycol and 34.3 g of di-tert-butyl peroxide and a mixture consisting of 680.0 g of methyl methacrylate, 445.0 g of 2-hydroxyethyl methacrylate and 482.2 g of n-butyl acrylate and 375.0 g of methacrylic acid ester 17.4 were added dropwise simultaneously within 5 hours. Immediately afterwards a mixture consisting of 8.0 g of butyl glycol and 20.0 g of di-tert-butyl peroxide and a mixture consisting of 127.5 g of methyl methacrylate, 180.0 g of 2-hydroxyethyl methacrylate, 100.0 g of n-butyl acrylate and 60 g of acrylic acid were added simultaneously. The mixture was then stirred for 1 hour at 138° C., then cooled to 100° C. and 77.9 g of N,N-dimethyl ethanolamine were added. After homogenising for 30 minutes, the mixture was dispersed with 2795 g of water within 2 hours at 80° C. A copolymer dispersion with the following data was obtained:

| | |
|---|---|
| OH content (theoretical from solids) | 3.3% |
| Acid value (solids) | 21 mg KOH/g |
| Solids content | 43.0% |
| Viscosity | 1750 mPas$_{23°\,C.}$ |
| pH (10% in water) | 8.2 |
| Degree of neutralisation | 105% |
| Average particle size | 121 nm |
| Co-solvent: | 7.7 wt. % |

Example 3

According to the Invention, 30% Methacrylic Acid Ester 17.4

158.3 g of butyl glycol and 220.6 g of Solvesso® 100 were placed in a 6 l reaction vessel with stirrer, cooling device and heating device and heated to 138° C. At this temperature a mixture consisting of 8 g of butyl glycol and 8 g of di-tert-butyl peroxide was added dropwise within 30 minutes. Then a mixture consisting of 34.3 g of butyl glycol and 34.3 g of di-tert-butyl peroxide and a mixture consisting of 460.5 g of methyl methacrylate, 445.0 g of 2-hydroxyethyl methacrylate and 326.7 g of n-butyl acrylate and 750.0 g of methacrylic acid ester 17.4 were added dropwise simultaneously within 5 hours. Immediately afterwards a mixture consisting of 8.0 g of butyl glycol and 20.0 g of di-tert-butyl peroxide and a mixture consisting of 127.5 g of methyl methacrylate, 180.0 g of 2-hydroxyethyl methacrylate, 100.0 g of n-butyl acrylate and 60 g of acrylic acid were added simultaneously. The mixture was then stirred for 1 hour at 138° C., then cooled to 100° C. and 77.9 g of N,N-dimethyl ethanolamine were added. After homogenising for 30 minutes, the mixture was dispersed with 3155 g of water within 2 hours at 80° C. A copolymer dispersion with the following data was obtained:

| | |
|---|---|
| OH content (theoretical from solids) | 3.3% |
| Acid value (solids) | 20 mg KOH/g |
| Solids content | 40.5% |
| Viscosity | 2950 mPas$_{23°\,C.}$ |
| pH (10% in water) | 8.4 |
| Degree of neutralisation | 105% |
| Average particle size | 110 nm |
| Co-solvent: | 7.7 wt. % |

Example 4

According to the Invention, 40% Methacrylic Acid Ester 17.4

158.3 g of butyl glycol and 220.6 g of Solvesso® 100 were placed in a 6 l reaction vessel with stirrer, cooling device and heating device and heated to 138° C. At this temperature a mixture consisting of 8 g of butyl glycol and 8 g of di-tert-butyl peroxide was added dropwise within 30 minutes. Then a mixture consisting of 34.3 g of butyl glycol and 34.3 g of di-tert-butyl peroxide and a mixture consisting of 460.5 g of methyl methacrylate, 445.0 g of 2-hydroxyethyl methacrylate and 76.7 g of n-butyl acrylate and 1000.0 g of methacrylic acid ester 17.4 were added dropwise simultaneously within 5 hours. Immediately afterwards a mixture consisting of 8.0 g of butyl glycol and 20.0 g of di-tert-butyl peroxide and a mixture consisting of 127.5 g of methyl methacrylate, 180.0 g of 2-hydroxyethyl methacrylate, 100.0 g of n-butyl acrylate and 60 g of acrylic acid were added simultaneously. The mixture was then stirred for 1 hour at 138° C., then cooled to 100° C. and 77.9 g of N,N-dimethyl ethanolamine were added. After homogenising for 30 minutes, the mixture was dispersed with 3155 g of water within 2 hours at 80° C. A copolymer dispersion with the following data was obtained:

| | |
|---|---|
| OH content (theoretical from solids) | 3.3% |
| Acid value (solids) | 20 mg KOH/g |
| Solids content | 40.3% |
| Viscosity | 2200 mPas$_{23°\,C.}$ |
| pH (10% in water) | 8.3 |
| Degree of neutralisation | 105% |
| Average particle size | 133 nm |
| Co-solvent: | 7.7 wt. % |

Example 5

According to the Invention, 15% Meth Acrylic Acid Ester 13.0

158.3 g of butyl glycol and 220.6 g of Solvesso® 100 were placed in a 6 l reaction vessel with stirrer, cooling device and heating device and heated to 138° C. At this temperature a mixture consisting of 8 g of butyl glycol and 8 g of di-tert-butyl peroxide was added dropwise within 30 minutes. Then a mixture consisting of 34.3 g of butyl glycol and 34.3 g of di-tert-butyl peroxide and a mixture consisting of 680.0 g of methyl methacrylate, 445.0 g of 2-hydroxyethyl methacrylate and 482.2 g of n-butyl acrylate and 375.0 g of methacrylic acid ester 13.0 were added dropwise simultaneously within 5 hours. Immediately afterwards a mixture consisting of 8.0 g of butyl glycol and 20.0 g of di-tert-butyl peroxide and a mixture consisting of 127.5 g of methyl methacrylate, 180.0 g of 2-hydroxyethyl methacrylate, 100.0 g of n-butyl acrylate and 60 g of acrylic acid were added simultaneously. The mixture was then stirred for 1 hour at 138° C., then cooled to 100° C. and 77.9 g of N,N-dimethyl ethanolamine were added. After homogenising for 30 minutes, the mixture was dispersed with 2765 g of water within 2 hours at 80° C. A copolymer dispersion with the following data was obtained:

| | |
|---|---|
| OH content (theoretical from solids) | 3.3% |
| Acid value (solids) | 20 mg KOH/g |
| Solids content | 43.5% |
| Viscosity | 1950 mPas$_{23°\,C.}$ |
| pH (10% in water) | 8.3 |
| Degree of neutralisation | 105% |
| Average particle size | 116 nm |
| Co-solvent: | |

Example 6

According to the Invention, 15% 2-Ethylhexyl Methacrylate 158.3 g of butyl glycol and 220.6 g of Solvesso® 100 were placed in a 6 l reaction vessel with stirrer, cooling device and heating device and heated to 138° C. At this temperature a mixture consisting of 8 g of butyl glycol and 8 g of di-tert-butyl peroxide was added dropwise within 30 minutes. Then a mixture consisting of 34.3 g of butyl glycol and 34.3 g of di-tert-butyl peroxide and a mixture consisting of 680.0 g of methyl methacrylate, 445.0 g of 2-hydroxyethyl methacrylate and 482.2 g of n-butyl acrylate and 375.0 g of 2-ethylhexyl acrylate were added dropwise simultaneously within 5 hours. Immediately afterwards a mixture consisting of 8.0 g of butyl glycol and 20.0 g of di-tert-butyl peroxide and a mixture consisting of 127.5 g of methyl methacrylate, 180.0 g of 2-hydroxyethyl methacrylate, 100.0 g of n-butyl acrylate and 60 g of acrylic acid were added simultaneously. The mixture was then stirred for 1 hour at 138° C., then cooled to 100° C. and 77.9 g of N,N-dimethyl ethanolamine were added. After homogenising for 30 minutes, the mixture was dispersed with 2675 g of water within 2 hours at 80° C. A copolymer dispersion with the following data was obtained:

| | |
|---|---|
| OH content (theoretical from solids) | 3.3% |
| Acid value (solids) | 21 mg KOH/g |
| Solids content | 45.0% |
| Viscosity | 1720 mPas$_{23° C.}$ |
| pH (10% in water) | 8.5 |
| Degree of neutralisation | 105% |
| Average particle size | 131 nm |
| Co-solvent: | 7.7 wt. % |

Example 7

According to the Invention, 15% Stearyl Methacrylate 158.3 g of butyl glycol and 220.6 g of Solvesso® 100 were placed in a 6 l reaction vessel with stirrer, cooling device and heating device and heated to 138° C. At this temperature a mixture consisting of 8 g of butyl glycol and 8 g of di-tert-butyl peroxide was added dropwise within 30 minutes. Then a mixture consisting of 34.3 g of butyl glycol and 34.3 g of di-tert-butyl peroxide and a mixture consisting of 680.0 g of methyl methacrylate, 445.0 g of 2-hydroxyethyl methacrylate and 482.2 g of n-butyl acrylate and 375.0 g of stearyl methacrylate were added dropwise simultaneously within 5 hours. Immediately afterwards a mixture consisting of 8.0 g of butyl glycol and 20.0 g of di-tert-butyl peroxide and a mixture consisting of 127.5 g of methyl methacrylate, 180.0 g of 2-hydroxyethyl methacrylate, 100.0 g of n-butyl acrylate and 60 g of acrylic acid were added simultaneously. The mixture was then stirred for 1 hour at 138° C., then cooled to 100° C. and 77.9 g of N,N-dimethyl ethanolamine were added. After homogenising for 30 minutes, the mixture was dispersed with 2765 g of water within 2 hours at 80° C. A copolymer dispersion with the following data was obtained:

| | |
|---|---|
| OH content (theoretical from solids) | 3.3% |
| Acid value (solids) | 20 mg KOH/g |
| Solids content | 43.1% |
| Viscosity | 2250 mPas$_{23° C.}$ |
| pH (10% in water) | 8.5 |
| Degree of neutralisation | 105% |
| Average particle size | 115 nm |
| Co-solvent: | 7.6 wt. % |

Application Examples 8A to H

Clear coats were formulated in accordance with the table below and applied using a graduated knife. The blister limit was determined visually after 30 minutes' evaporation at room temperature and 20 minutes' forced drying at 80° C.:

TABLE 1

Determination of the blister limit

| Amounts used in [g] | A | B | C | D | E | F | G | H |
|---|---|---|---|---|---|---|---|---|
| Example 1 | 504 | | | | | | | |
| Example 2 | | 524 | | | | | | |
| Example 3 | | | 555 | | | | | 555 |
| Example 4 | | | | 558 | | | | |
| Example 5 | | | | | 508 | | | |
| Example 6 | | | | | | 491 | | |
| Example 7 | | | | | | | 522 | |
| Surfynol® 104 BC | 11.3 | 11.3 | 11.3 | 11.3 | 11.3 | 11.3 | 11.3 | 11.3 |
| Borchigel® PW25 | 1.5 | 1.5 | 1.5 | 1.5 | 1.5 | 1.5 | 1.5 | 1.5 |
| Baysilon® VP AI 3468 | 9.4 | 9.4 | 9.4 | 9.4 | 9.4 | 9.4 | 9.4 | 9.4 |
| Bayhydur® VP LS 2319 80% in Butoxyl® | 191.1 | 191.1 | 191.1 | 191.1 | 191.1 | 191.1 | 191.1 | 44.5 |
| Desmodur® XP 2565 | | | | | | | | 178.1 |
| Water | 65 | 10 | 16 | 11 | 61 | 78 | 12 | 18 |
| Blister limit [μm] | 60 | 90 | 130 | 110 | 100 | 105 | 120 | 145 |

All the references described above are incorporated by reference in its entirety for all useful purposes.

While there is shown and described certain specific structures embodying the invention, it will be manifest to those skilled in the art that various modifications and rearrangements of the parts may be made without departing from the spirit and scope of the underlying inventive concept and that the same is not limited to the particular forms herein shown and described.

The invention claimed is:

1. An aqueous secondary dispersion comprising a copolymer P) synthesized from
   I) a hydroxy-functional, hydrophobic polymer comprising monomer units derived from
      Ia) (meth)acrylic acid esters having C1 to C22 hydrocarbon radicals in the alcohol part, and optionally vinyl aromatics vinyl esters, or mixtures thereof, and
      Ib) hydroxy-functional monomers, and
   II) a hydroxy-functional, hydrophilic polymer comprising monomer units derived from
      IIa) (meth)acrylic acid esters having C1 to C22 hydrocarbon radicals in the alcohol part, and optionally vinyl aromatics, vinyl esters, or mixtures thereof,
      IIb) hydroxy-functional monomers, and
      IIc) acid-functional monomers,
   wherein said monomer units derived from said (meth)acrylic acid esters of Ia) and IIa) comprise monomer units B) derived from (meth)acrylic acid esters comprising an aliphatic radical with at least eight carbon atoms in the alcohol part and whose content, based on the copolymer P), is at least 12.5 wt. %.

2. The aqueous secondary dispersion according to claim 1, wherein (1) the proportion of monomer units derived from Ia) and IIa), including monomer units B), in copolymer P) is from 23 to 89.4 parts by weight, (2) the proportion of monomer units derived from Ib) and IIb) in copolymer P) is from 10 to 65 parts by weight and (3) the proportion of monomer units derived from IIc) in copolymer P) is from 0.6 to 12 parts by weight based on the total weight of copolymer P).

3. The aqueous secondary dispersion according to claim 1, wherein the monomer units B) are derived from (meth)acrylic acid esters having C16 to C22 hydrocarbon radicals in the alcohol part.

4. The aqueous secondary dispersion according to claim 1, wherein the monomers B) are compounds having the formula (II) below

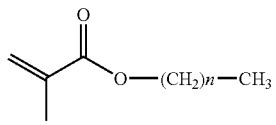

II)

wherein n=12, 16.4 or 18.

5. The aqueous secondary dispersion according to claim 1, wherein said aqueous secondary dispersion is an aqueous polyacrylate dispersion and wherein the acid-functional monomers IIc) are used in an amount such that the copolymer P) has an acid value of from 5 to 55 mg KOH/g solids.

6. The aqueous secondary dispersion according to claim 1, wherein said aqueous secondary dispersion is an aqueous polyacrylate dispersion, the proportion of hydroxy-functional, hydrophobic polymer I) in the copolymer P) is from 50 to 95 parts by weight and the proportion of hydroxy-functional, hydrophilic polymer II) in the copolymer P) is from 5 to 50 parts by weight.

* * * * *